US012602985B2

(12) United States Patent
Tiwari

(10) Patent No.: US 12,602,985 B2
(45) Date of Patent: Apr. 14, 2026

(54) CRASH SEVERITY DETECTION SYSTEM AND RELATED METHODS

(71) Applicant: ZF Friedrichshafen AG, Friedrichshafen (DE)

(72) Inventor: Dhruv Tiwari, Hyderabad (IN)

(73) Assignee: ZF Friedrichshafen AG, Friedrichshafen (DE)

( * ) Notice: Subject to any disclaimer, the term of this patent is extended or adjusted under 35 U.S.C. 154(b) by 70 days.

(21) Appl. No.: 18/657,907

(22) Filed: May 8, 2024

(65) Prior Publication Data

US 2025/0349202 A1 Nov. 13, 2025

(51) Int. Cl.
*G08B 25/00* (2006.01)
*G08G 1/16* (2006.01)

(52) U.S. Cl.
CPC ............. *G08B 25/00* (2013.01); *G08G 1/164* (2013.01)

(58) Field of Classification Search
CPC . G06F 21/32; G06F 3/167; G06F 8/65; G06F 21/35; G06F 21/316; G06F 3/017; G06F 1/163; G06F 21/43; G06F 21/606; G06F 3/0484; G06F 18/214; G06F 21/6245; G06F 3/165; G06F 9/445; G06F 21/31; G06F 3/0488; G06F 18/251; G06F 3/012; G06F 1/1686; G06F 18/20; G06F 18/21; G06F 3/0482; G06F 16/957; G06F 3/011; G06F 16/639; G06F 16/686; G06F 2009/4557; G06F 2009/45587; G06F 2009/45595; G06F 40/169; G06F 9/455; G06F 9/45529; G06F 9/45533; G06F 9/45558; G06F 9/46; G06F 16/9535; G06F 21/6254; G06F 21/62; G06F 2221/2111; G06F 21/33; G06F 21/604; G06F 2203/04808; G06F 21/45; G06F 2221/2133; G06F 8/71; G06F 16/00; G06F 3/0346; G06F 1/3203; G06F 1/3231; G06F 16/9027; G06F 16/903; G06F 3/0481; G06F 8/433; G06F 16/335; G06F 21/84; G06F 3/0236; G06F 3/0412; G06F 3/04847; G06F 3/04886; G06F 9/451; G06F 16/24; G06F 16/9537; G06F 21/629; G06F 21/88;
(Continued)

(56) References Cited

U.S. PATENT DOCUMENTS 5,458,367 A * 10/1995 Marts ...................... B60R 21/12 280/743.1
9,672,719 B1 * 6/2017 Hollenstain ............ G08B 21/18
(Continued)

*Primary Examiner* — Daniel Previl
(74) *Attorney, Agent, or Firm* — Miller Johnson

(57) ABSTRACT

A system includes memory hardware configured to store instructions and processor hardware configured to execute the instructions. The instructions include, in response to a vehicle being in an accident, receiving, from a set of sensors, information associated with the vehicle. The instructions include determining a severity rating of the accident based on at least some of the information. The instructions include determining a location of the vehicle based on at least some of information. The instructions include determining a set of emergency responders located closest to the vehicle. The instructions include transmitting a notification to the set of emergency responders. The notification includes at least the severity rating of the accident and the location of the vehicle.

17 Claims, 3 Drawing Sheets

(58) Field of Classification Search

CPC ............. G06F 2221/2139; G06F 3/013; G06F 3/04842; G06F 3/1454; G06F 40/40; G06F 21/10; G06F 21/105; G06F 21/121; G06F 2221/2113; G06F 2221/2149; G06F 3/002; G06F 3/007; G06F 3/016; G06F 3/048; G06F 1/1684; G06F 15/76; G06F 16/168; G06F 16/242; G06F 16/3325; G06F 16/3326; G06F 16/334; G06F 21/577; G06F 21/6227; G06F 3/1423; G06F 15/16; G06F 16/27; G06F 16/90332; G06F 16/9538; G06F 21/1011; G06F 2221/2137; G06F 3/147; G06F 1/1652; G06F 1/1692; G06F 16/955; G06F 18/2148; G06F 18/217; G06F 18/22; G06F 21/566; G06F 21/602; G06F 21/6218; G06F 21/75; G06F 2203/0338; G06F 2203/0339; G06F 2203/0381; G06F 2221/034; G06F 2221/2103; G06F 3/005; G06F 3/01; G06F 3/038; G06F 3/0416; G06F 3/0486; G06F 3/04883; G06F 40/30; G06F 8/60; G06F 9/54; G06F 9/542; G06F 1/1632; G06F 13/36; G06F 16/2379; G06F 16/2456; G06F 16/285; G06F 16/435; G06F 16/4387; G06F 16/93; G06F 16/9536; G06F 21/00; G06F 21/40; G06F 21/44; G06F 21/554; G06F 21/86; G06F 2213/40; G06F 3/14; G06F 9/547; G06F 16/176; G06F 16/22; G06F 16/2246; G06F 16/2465; G06F 16/248; G06F 16/29; G06F 16/683; G06F 16/784; G06F 16/9035; G06F 16/906; G06F 16/907; G06F 16/909; G06F 16/9558; G06F 17/15; G06F 17/16; G06F 18/25; G06F 21/1063; G06F 21/16; G06F 21/335; G06F 21/41; G06F 21/445; G06F 21/54; G06F 21/57; G06F 21/608; G06F 21/64; G06F 21/83; G06F 2200/1635; G06F 2213/0038; G06F 2218/02; G06F 2221/033; G06F 3/02; G06F 3/0304; G06F 3/041; G06F 3/04817; G06F 3/1222; G06F 3/1238; G06F 3/1285; G06F 3/1292; G06F 40/205; G06F 40/263; G06F 21/552; G06F 30/20; G06F 8/35; G06F 8/41; G06F 8/61; G06F 8/62; G06F 9/4451; G06F 11/3438; G06F 15/173; G06F 16/16; G06F 16/1734; G06F 16/2255; G06F 16/2365; G06F 16/245; G06F 16/258; G06F 16/284; G06F 16/35; G06F 16/40; G06F 16/43; G06F 16/433; G06F 16/434; G06F 16/48; G06F 16/487; G06F 16/687; G06F 16/70; G06F 16/90344; G06F 18/2431; G06F 21/1013; G06F 21/34; G06F 21/36; G06F 21/46; G06F 21/55; G06F 21/564; G06F 2203/04803; G06F 2203/04806; G06F 2218/12; G06F 2221/2117; G06F 2221/2131; G06F 2221/2147; G06F 3/1446; G06F 3/16; G06F 40/117; G06F 40/253; G06F 40/268; G06F 40/58; G06F 9/543; G06Q 30/0207; G06Q 30/0217; G06Q 30/0206; G06Q 50/00; G06Q 20/4014; G06Q 10/10; G06Q 20/40; G06Q 50/01; G06Q 20/389; G06Q 30/02; G06Q 30/06; G06Q 30/0601; G06Q 20/4016; G06Q 10/06313; G06Q 10/109; G06Q 20/40145; G06Q 50/265; G06Q 20/405; G06Q 20/12; G06Q 20/322; G06Q 20/385; G06Q 30/0261; G06Q 10/20; G06Q 20/0457; G06Q 20/20; G06Q 20/3224; G06Q 30/0269; G06Q 10/107; G06Q 20/10; G06Q 20/3821; G06Q 2220/00; G06Q 30/0641; G06Q 50/184; G06Q 20/384; G06Q 30/0277; G06Q 40/04; G06Q 10/06311; G06Q 20/3278; G06Q 20/401; G06Q 2220/18; G06Q 30/0241; G06Q 10/101; G06Q 20/02; G06Q 20/047; G06Q 20/18; G06Q 20/3223; G06Q 20/42; G06Q 30/0222; G06Q 30/0251; G06Q 30/0258; G06Q 30/0259; G06Q 30/0263; G06Q 30/0264; G06Q 40/02; G06Q 50/20; G06Q 20/045; G06Q 20/102; G06Q 20/3227; G06Q 20/3274; G06Q 20/3823; G06Q 20/4018; G06Q 2240/00; G06Q 30/0281; G06Q 30/04; G06Q 30/0643; G06Q 40/00; G06Q 10/06; G06Q 10/1057; G06Q 10/1093; G06Q 20/1235; G06Q 20/363; G06Q 30/0225; G06Q 30/0265; G06Q 30/0635; G06Q 40/03; G06Q 50/163; G06Q 10/0631; G06Q 20/145; G06Q 20/202; G06Q 20/321; G06Q 20/3226; G06Q 20/34; G06Q 20/3674; G06Q 20/3825; G06Q 20/3829; G06Q 20/386; G06Q 20/4015; G06Q 20/4093; G06Q 30/0201; G06Q 30/0239; G06Q 30/0267; G06Q 30/0271; G06Q 30/0275; G06Q 30/0283; G06Q 30/0609; G06Q 30/0631; G06Q 30/0637; G06Q 30/0645; G06Q 50/18; G06Q 10/00; G06Q 10/063114; G06Q 10/0635; G06Q 10/0639; G06Q 10/0836; G06Q 10/087; G06Q 20/00; G06Q 20/027; G06Q 20/065; G06Q 20/0855; G06Q 20/1085; G06Q 20/201; G06Q 20/204; G06Q 20/22; G06Q 20/3276; G06Q 20/367; G06Q 20/3678; G06Q 20/38215; G06Q 20/3827; G06Q 20/4012; G06Q 20/4097; G06Q 30/00; G06Q 30/0185; G06Q 30/0242; G06Q 30/0278; G06Q 30/0611; G06Q 50/16; G06Q 50/26; G06Q 50/34; G06Q 50/40; G06Q 90/20; G06Q 10/063; G06Q 10/08; G06Q 10/0833; G06Q 20/04; G06Q 20/0655; G06Q 20/108; G06Q 20/123; G06Q 20/127; G06Q 20/203; G06Q 20/206; G06Q 20/208; G06Q 20/209; G06Q 20/28; G06Q 20/306; G06Q 20/325; G06Q 20/326; G06Q 20/354; G06Q 20/36; G06Q 20/383; G06Q 20/387; G06Q 20/409; G06Q 20/425; G06Q 2220/10; G06Q 30/01; G06Q 30/0204; G06Q 30/0214; G06Q 30/0247; G06Q 30/0254; G06Q 30/0266; G06Q 30/0282; G06Q 30/0603; G06Q 30/0607; G06Q 30/0633; G06Q 30/0639; G06Q 40/12; G06Q 40/08; G06Q 10/02; G06Q 30/08; G06Q 40/08221; G06Q 40/08223; G06Q 40/086; H04L 63/0861; H04L 9/3231; H04L 67/306; H04L 67/10; H04L 67/12; H04L 2209/56; H04L 63/08; H04L

67/535; H04L 9/50; H04L 67/02; H04L 67/52; H04L 63/102; H04L 67/75; H04L 9/3239; H04L 63/0272; H04L 63/0853; H04L 63/1425; H04L 65/612; H04L 67/34; H04L 9/3226; H04L 47/2425; H04L 47/25; H04L 63/083; H04L 9/3271; H04L 9/3297; H04L 67/60; H04L 9/0866; H04L 2463/082; H04L 51/58; H04L 61/5007; H04L 63/10; H04L 9/3213; H04L 12/1895; H04L 2209/805; H04L 63/061; H04L 69/18; H04L 1/00; H04L 2101/659; H04L 51/066; H04L 51/10; H04L 63/0428; H04L 63/105; H04L 9/0618; H04L 9/3247; H04L 63/20; H04L 9/14; H04L 2209/04; H04L 2209/16; H04L 2209/24; H04L 51/52; H04L 67/141; H04L 9/0819; H04L 9/0844; H04L 12/2834; H04L 51/046; H04L 51/214; H04L 65/1069; H04L 67/303; H04L 67/53; H04L 67/55; H04L 12/1822; H04L 41/5019; H04L 51/56; H04L 63/1416; H04L 41/0853; H04L 51/04; H04L 63/0807; H04L 63/0823; H04L 63/0876; H04L 65/611; H04L 67/1014; H04L 67/146; H04L 67/56; H04L 9/30; H04L 9/3265; H04L 12/4625; H04L 2209/80; H04L 41/5009; H04L 51/18; H04L 51/234; H04L 63/107; H04L 63/1483; H04L 65/403; H04L 67/51; H04L 9/0841; H04L 9/3228; H04L 12/1845; H04L 12/28; H04L 12/2814; H04L 43/0811; H04L 65/1016; H04L 65/762; H04L 67/06; H04L 67/563; H04L 67/564; H04L 69/22; H04L 9/006; H04L 9/008; H04L 63/062; H04L 63/0884; H04L 63/101; H04L 63/126; H04L 65/61; H04L 67/54; H04L 9/0637; H04L 9/0825; H04L 9/3215; H04L 9/3236; H04L 1/008; H04L 12/1818; H04L 12/2803; H04L 2209/84; H04L 2209/88; H04L 43/0858; H04L 43/0876; H04L 45/12; H04L 51/02; H04L 51/42; H04L 61/2592; H04L 63/0227; H04L 63/0414; H04L 63/104; H04L 63/18; H04L 65/1104; H04L 65/65; H04L 65/752; H04L 65/80; H04L 67/1097; H04L 67/63; H04L 9/0872; H04L 9/0894; H04L 9/32; H04L 9/3273; H04L 12/18; H04L 12/2816; H04L 12/2818; H04L 12/282; H04L 12/2825; H04L 12/2827; H04L 2012/285; H04L 2101/622; H04L 41/0677; H04L 41/0806; H04L 41/082; H04L 41/0843; H04L 41/0889; H04L 41/0893; H04L 41/0894; H04L 41/12; H04L 41/22; H04L 47/808; H04L 47/821; H04L 47/824; H04L 51/00; H04L 51/216; H04L 51/224; H04L 63/0442; H04L 63/0869; H04L 9/0656; H04L 9/083; H04L 9/0861; H04L 9/0869; H04L 9/321; H04L 9/3234; H04L 9/3242; H04L 9/3263; H04L 9/3268; H04L 12/1854; H04L 12/189; H04L 12/2856; H04L 12/66; H04L 2101/681; H04L 2209/42; H04L 2209/60; H04L 2463/061; H04L 2463/062; H04L 51/48; H04L 63/0407; H04L 63/0421; H04L 63/0492; H04L 63/068; H04L 63/0815; H04L 63/0838; H04L 63/0846; H04L 63/1433; H04L 63/1441; H04L 63/1466; H04L 63/30; H04L 63/304; H04L 65/1089; H04L 67/025; H04L 67/04; H04L 67/125; H04L 67/30; H04L 67/50; H04L 67/562; H04L 69/169; H04L 69/329; H04L 9/00; H04L 9/0838; H04L 9/0852; H04L 9/0863; H04L 9/088; H04L 9/3218; H04L 9/3278; H04W 4/02; H04W 12/06; H04W 4/80; H04W 12/08; H04W 4/021; H04W 4/029; H04W 4/40; H04W 4/024; H04W 4/44; H04W 4/50; H04W 4/46; H04W 12/02; H04W 4/12; H04W 12/068; H04W 4/90; H04W 76/10; H04W 8/22; H04W 4/023; H04W 12/37; H04W 12/50; H04W 12/63; H04W 4/025; H04W 4/60; H04W 12/069; H04W 4/16; H04W 84/18; H04W 4/38; H04W 12/065; H04W 12/041; H04W 12/68; H04W 4/00; H04W 88/16; H04W 4/027; H04W 4/48; H04W 28/06; H04W 4/06; H04W 12/33; H04W 12/03; H04W 12/033; H04W 12/67; H04W 52/0254; H04W 52/0258; H04W 52/027; H04W 12/71; H04W 8/005; H04W 12/04; H04W 12/082; H04W 4/026; H04W 48/02; H04W 80/02; H04W 84/12; H04W 88/02; H04W 12/084; H04W 12/12; H04W 12/66; H04W 48/16; H04W 64/00; H04W 76/50; H04W 8/18; H04W 12/30; H04W 12/61; H04W 36/0038; H04W 36/00837; H04W 36/0085; H04W 36/1446; H04W 36/302; H04W 4/70; H04W 12/0471; H04W 12/126; H04W 12/64; H04W 12/77; H04W 24/02; H04W 48/06; H04W 72/51; H04W 12/72; H04W 12/75; H04W 28/0226; H04W 4/022; H04W 4/35; H04W 64/006; H04W 72/53; H04W 92/18; H04W 12/122; H04W 12/43; H04W 12/65; H04W 28/0215; H04W 36/0009; H04W 36/08; H04W 4/10; H04W 4/14; H04W 4/21; H04W 40/12; H04W 40/20; H04W 48/04; H04W 40/02; H04W 48/18; H04W 52/0206; H04W 52/0219; H04W 52/0264; H04W 52/12; H04W 52/143; H04W 52/225; H04W 52/241; H04W 52/346; H04W 72/20; H04W 72/23; H04W 76/45; H04W 8/06; H04W 8/08; H04W 8/24; H04W 8/26; H04W 80/10; H04W 84/005; H04W 12/00; H04W 12/10; H04W 12/35; H04W 12/47; H04W 28/20; H04W 4/08; H04W 4/18; H04W 4/24; H04W 4/33; H04W 8/245; H04W 12/062; H04W 12/108; H04W 12/128; H04W 12/69; H04W 12/73; H04W 28/18; H04W 4/23; H04W 48/10; H04W 48/12; H04W 72/56; H04W 76/11; H04W 76/15; H04W 8/205; H04W 80/00; H04W 84/042; H04W 92/02; H04W 92/08; G06V 40/172; G06V 40/20; G06V 40/70; G06V 40/171; G06V 40/1365; G06V 40/197; G06V 40/16; G06V 40/10; G06V 40/15; G06V 20/10; G06V 20/58; G06V 10/803; G06V 40/165; G06V 20/597; G06V 10/82;

G06V 40/168; G06V 40/161; G06V 40/166; G06V 10/95; G06V 10/50; G06V 40/45; G06V 20/52; G06V 10/454; G06V 10/56; G06V 10/764; G06V 20/20; G06V 20/54; G06V 20/59; G06V 40/107; G06V 40/1306; G06V 40/173; G06V 40/193; G06V 40/40; G06V 40/19; G06V 40/25; G06V 10/40; G06V 2201/10; G06V 40/1347; G06V 40/28; G06V 40/50; G06V 10/10; G06V 10/143; G06V 10/16; G06V 10/235; G06V 10/62; G06V 10/774; G06V 10/80; G06V 10/94; G06V 20/53; G06V 20/625; G06V 20/64; G06V 20/90; G06V 2201/12; G06V 30/10; G06V 40/103; G06V 40/11; G06V 40/117; G06V 40/12; G06V 40/13; G06V 40/167; G06V 40/178; G06V 10/25; G06V 10/70; G06V 10/751; G06V 10/757; G06V 10/761; G06V 10/7747; G06V 10/778; G06V 10/945; G06V 20/56; G06V 20/588; G06V 2201/07; G06V 30/18019; G06V 40/1394; G06V 40/174; G07C 5/02; G07C 5/0808; G07C 5/008; G07C 5/0816; G07C 9/37; G07C 9/00571; G07C 9/00944; G07C 9/00309; G07C 9/00563; G07C 5/085; G07C 9/23; G07C 9/257; G07C 9/27; G07C 9/28; G07C 9/20; G07C 9/25; G07C 2009/00507; G07C 2209/63; G07C 9/00174; G07C 9/22; G07C 9/29; G07C 5/0825; G07C 9/00904; G07C 9/10; G07C 9/26; G07C 1/00; G07C 2009/00325; G07C 2009/00428; G07C 2009/00769; G07C 2009/00793; G07C 2009/00841; G07C 2009/00873; G07C 2009/0092; G07C 2009/00984; G07C 2009/14; G07C 5/08; G07C 5/0841; G07C 5/0866; G07C 9/00817; G07C 9/00896; G07C 9/21; G07C 13/00; G07C 2009/00412; G07C 2209/62; G07C 9/00; G07C 9/38; G08G 1/091; G08G 1/0962; G08G 1/14; G08G 1/096725; G08G 1/096791; G08G 1/163; G08G 1/0112; G08G 1/0116; G08G 1/0129; G08G 1/0133; G08G 1/0137; G08G 1/07; G08G 1/096758; G08G 1/096783; G08G 1/096827; G08G 1/096844; G08G 1/162; G08G 1/164; G08G 1/166; G08G 1/096741; G08G 1/096716; G08G 1/0175; G08G 1/20; G08G 1/01; G08G 1/04; G08G 1/052; G08G 1/205; G08G 1/096838; G08G 1/0104; G08G 1/012; G08G 1/0145; G08G 1/096775; G10L 17/00; G10L 15/22; G10L 15/26; G10L 2015/223; G10L 17/06; G10L 21/0208; G10L 25/51; G10L 2021/02166; G10L 17/04; G10L 17/18; G10L 15/24; G10L 21/003; G10L 21/0272; G10L 21/034; G10L 25/78; G10L 2015/088; G10L 17/22; G10L 2021/02082; G10L 15/08; G10L 2015/227; G10L 15/30; G10L 15/32; G10L 15/20; G10L 21/02; G10L 21/0232; G10L 21/0316; G10L 25/21; G10L 2015/226; G10L 15/1822; G10L 15/28; G10L 2015/228; G10L 13/033; G10L 17/26; G10L 21/0364; G10L 15/00; G10L 15/01; G10L 15/07; G10L 15/1815; G10L 15/183; G10L 15/222; G10L 17/02; G10L 17/14; G10L 2015/0631; G10L 2015/0638; G10L 21/18; G10L 25/63; G10L 13/00; G10L 13/04; G10L 13/08; G10L 15/005; G10L 15/142; G10L 17/08; G10L 17/10; G10L 17/12; G10L 25/27; G10L 25/48; B60Q 9/008; B60Q 5/001; B60Q 1/507; B60Q 1/545; B60Q 1/549; B60Q 2400/40; B60Q 2400/50; B60Q 5/006; B60T 17/22; H05B 45/00; H05B 45/10; H05B 47/115; H05B 47/12; H04S 2400/11; H04S 2400/13; H04S 7/303; H04S 7/307; H04K 2203/12; H04K 3/42; H04K 3/86; G06N 20/00; G06N 3/08; G06N 20/20; G06N 5/01; G06N 5/022; B60W 2540/22; B60W 2540/221; B60W 2556/45; B60W 50/14; B60W 40/09; B60W 2050/143; B60W 2050/146; B60W 2540/043; B60W 2540/049; B60W 2540/223; B60W 2554/4041; B60W 2556/10; B60W 30/00; B60W 40/04; B60W 40/08; B60W 50/0097; B60W 50/0098; B60W 2040/0818; B60W 2040/0827; B60W 2050/0029; B60W 2420/40; B60W 2420/403; B60W 2540/30; B60W 2710/30; B60W 2050/0006; B60W 50/06; B60W 60/0015; G05D 1/0055; G05D 1/617; B60K 28/066; B60K 1/00; B60K 5/00; B60K 3/00; B60K 6/00; B60K 7/00; B60K 8/00; B60K 11/00; B60K 13/00; B60K 15/00; B60K 16/00; B60K 17/00; B60S 3/004; B60S 3/04; G01S 17/931; G08B 25/00; G08B 25/005; G08B 25/016; G08B 29/186; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 26/00; G08B 27/00; G08B 29/00; G08B 31/00

USPC .... 340/436, 426.22, 426.23, 426.15, 426.16, 340/426.19, 435, 438, 439, 539.22, 340/539.13, 588, 636.11, 691.3

See application file for complete search history.

(56) References Cited

U.S. PATENT DOCUMENTS

| | | | | |
|---|---|---|---|---|
| 2011/0153367 | A1* | 6/2011 | Amigo | G07C 5/008 701/31.4 |
| 2016/0094964 | A1* | 3/2016 | Barfield, Jr. | H04W 4/90 340/870.07 |
| 2017/0046216 | A1* | 2/2017 | Stenneth | G08B 25/016 |

* cited by examiner

CRASH SEVERITY DETECTION SYSTEM AND RELATED METHODS

FIELD

The present disclosure relates to a crash severity detection system and more particularly to a crash severity detection system that may be used in connection with vehicles.

BACKGROUND

Motor vehicle accidents represent a significant public health and safety concern worldwide. According to statistical data from various transportation authorities and safety organizations, millions of accidents occur annually, resulting in substantial economic losses, injuries, and fatalities. Accurate assessment of the severity of these accidents can allow for prompt and effective response by emergency services, insurance agencies, and other relevant stakeholders. Many lives could be saved if the individuals involved in accidents receive prompt medical treatment.

Traditionally, the determination of the severity of an accident has relied on observations by human responders based on visual inspection of the crash scene and witness statements. While these methods can provide valuable information, they also tend to be limited by factors such as human error, bias, and variability in judgment. Moreover, they can be time-consuming and may not always yield consistent or reliable results. In particular, these existing systems often lack accuracy and efficiency in assessing accident severity and lack the ability to determine the closest hospitals and/or first responders that would allow for the quick and efficient dispatching of medical personnel (e.g., paramedics, etc.) to the scene of an accident. As a result, valuable time may be lost in delivering timely medical care to accident victims, leading to potentially adverse consequences. Therefore, there is a need for scalable systems that overcome the limitations of existing approaches and promptly and accurately assess accident severity in real-time and notify the closest medical personnel to ensure timely and appropriate medical intervention.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a system. The system includes memory hardware configured to store instructions and processor hardware configured to execute the instructions. The instructions include, in response to a vehicle being in an accident, receiving, from a set of sensors, information associated with the vehicle. The instructions include determining a severity rating of the accident based on at least some of the information. The instructions include determining a location of the vehicle based on at least some of information. The instructions include determining a set of emergency responders located closest to the vehicle. The instructions include transmitting a notification to the set of emergency responders. The notification includes at least the severity rating of the accident and the location of the vehicle.

Another aspect of the disclosure provides a computer-implemented method. The method includes, in response to a vehicle being in an accident, receiving, from a set of sensors, information associated with the vehicle. The method includes determining a severity rating of the accident based on at least some of the information. The method includes determining a location of the vehicle based on at least some of the information. The method includes determining a set of emergency responders located closest to the vehicle. The method includes transmitting a notification to the set of emergency responders. The notification includes at least the severity of the accident and the location of the vehicle.

Yet another aspect of the disclosure provides a non-transitory computer-readable medium that includes processor-executable instructions. The instructions include, in response to a vehicle being in an accident, receiving, from a set of sensors, information associated with the vehicle. The instructions include determining a severity rating of the accident based on the information. The instructions include determining a location of the vehicle based on some of the information. The instructions include determining a set of closest emergency responders relative to the vehicle. The instructions include transmitting a notification to the set of closest emergency responders. The notification includes at least the severity of the accident and the location of the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
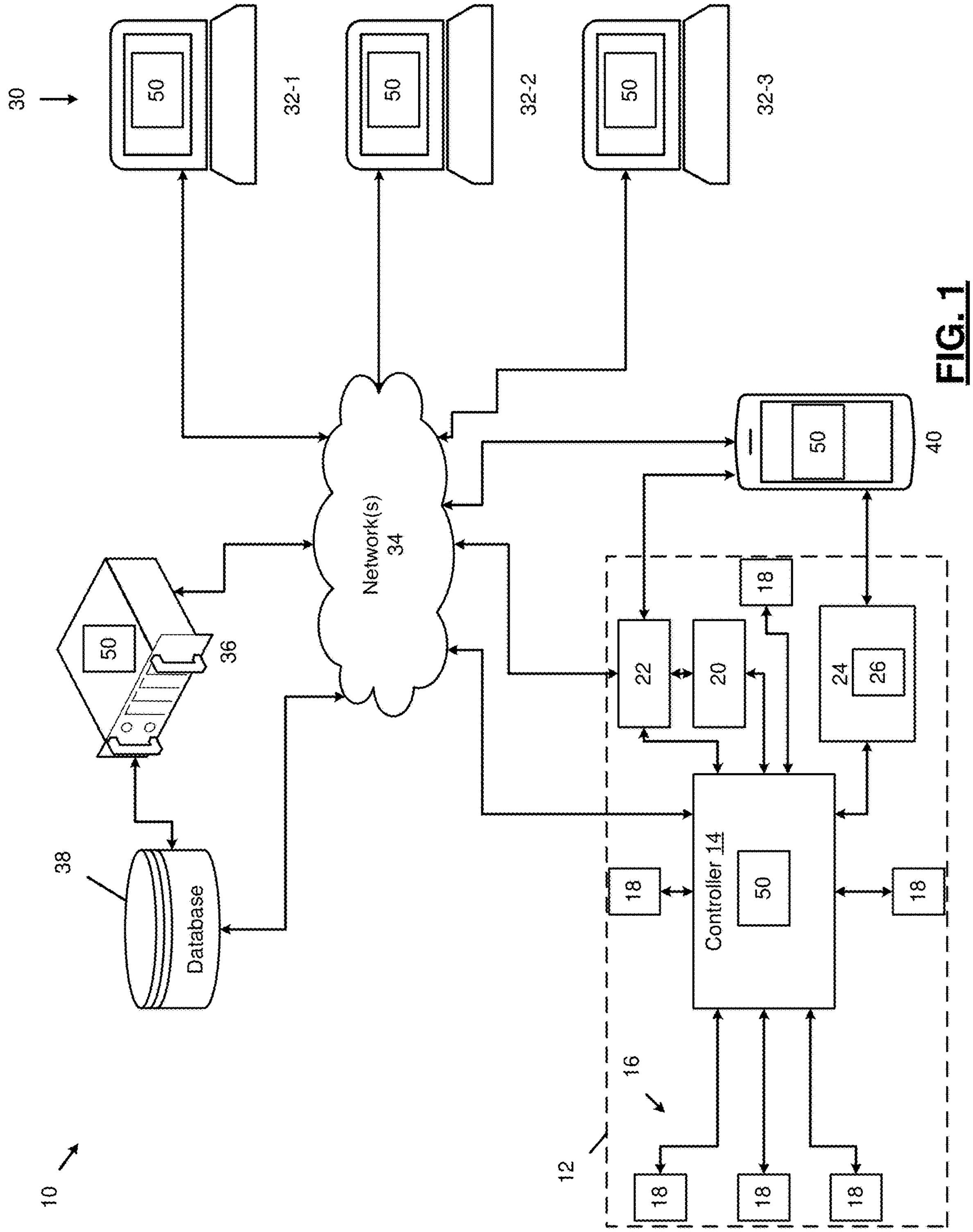
FIG. 1 is a functional block diagram of an example crash severity detection system in accordance with the principles of the present disclosure.

With reference to FIG. 1, an example crash severity detection system 10 is shown. In various implementations, the system 10 may include and/or may be incorporated with at least one vehicle 12 (e.g., an automobile). In various implementations, the vehicle 12 may include a controller 14, a sensor system 16 having a plurality of sensors 18, a global positioning system (GPS) 20, a communication system 22 (e.g., a telematics system), and/or an infotainment system 24 having a display 26, among others.

In various implementations, the controller 14 may be communicatively coupled with the sensor system 16, the GPS 20, the communication system 22, and/or the infotainment system 24. In some example configurations, the controller 14 may be incorporated with the communication system 22. In some examples, the controller 14 may be incorporated with the infotainment system 24. In some instances, the controller 14, the GPS 20, and/or the communication system 22 may be incorporated with the infotainment system 24.

In various implementations, the controller 14 includes an electronic controller and/or an electronic processor, such as a programmable microprocessor and/or microcontroller. The controller 14 may include an application specific integrated circuit (ASIC). The controller 14 may include a central processing unit (CPU), a memory (e.g., a non-transitory computer-readable storage medium), and/or an input/output (I/O) interface. The controller 14 may perform various functions, including those described in greater detail herein, with appropriate programming instructions and/or code embodied in software, hardware, and/or other medium. The controller 14 may include a plurality of controllers. The controller 14 may be connected to a display (e.g., display 26), such as a touch screen.

In various implementations, the sensor system 16 includes one or more sensors 18 such as an impact sensor, a strain gauge, an inertial measurement unit, a camera, a wheel speed sensor, a steering angle sensor, an accelerometer, a gyroscope, a magnetometer, an airbag sensor, a collision detection sensor, a temperature sensor, a rain sensor, a microphone, and/or a light sensor, among others. In various implementations, the sensor(s) 18 may collect information associated with the vehicle and/or one or more occupants (e.g., driver, passenger) of the vehicle 12.

In various implementations, the vehicle 12 (e.g., the controller 14, the communication system 22, and/or the infotainment system 24) may be communicatively coupled to one or more computing devices 30 (e.g., computer, laptop, cell phone, dispatch system, etc.) associated with one or more hospitals 32-1, one or more police departments 32-2, and/or one or more fire departments 32-3 via one or more networks 34 (e.g., the cloud). For example, in accordance with the vehicle 12 being in an accident (e.g., a rear end collision, a head on collision, a side impact collision, a rollover accident, a single vehicle accident, a side swipe accident, a multi vehicle pileup, a pedestrian accident, or a cyclist accident, among others), the vehicle 12 may transmit information to at least one of the electronic devices 30 such that one or more emergency responders may be notified of the accident and may be dispatched to the location of the vehicle 12. In various implementations, an emergency responder may include an individual associated with a hospital, a police officer, a firefighter, or a paramedic, among others. In various implementations, the communication between the vehicle 12 and the electronic devices 30 may be facilitated via 5G eSIMs.

In various implementations, the vehicle 12 is communicatively coupled to the network 34 such that the vehicle 12 may transmit information to and/or may receive information from various computing devices and/or databases connected to the network 34. In various implementations, the network 34 may include, may be associated with, and/or may be communicatively coupled with one or more remote servers 36. In various implementations, one or more databases (e.g., database 38) may be communicatively coupled to the network 34 and/or the server 36. In various implementations, one or more user devices 40 (e.g., cell phone, computer, laptop, tablet, etc.) may be communicatively coupled to the vehicle 12 and/or the network 34, among others. A user of a user device 40 may include an occupant of the vehicle 12 (e.g., driver, passenger).

In various implementations, the system 10 may include and/or may be associated with at least one software application 50. In various implementations, the application 50 may be executed via the vehicle 12 (e.g., the controller 14, etc.), the server 36, the devices 30, and/or the user device 40, among others.

Figure 2:
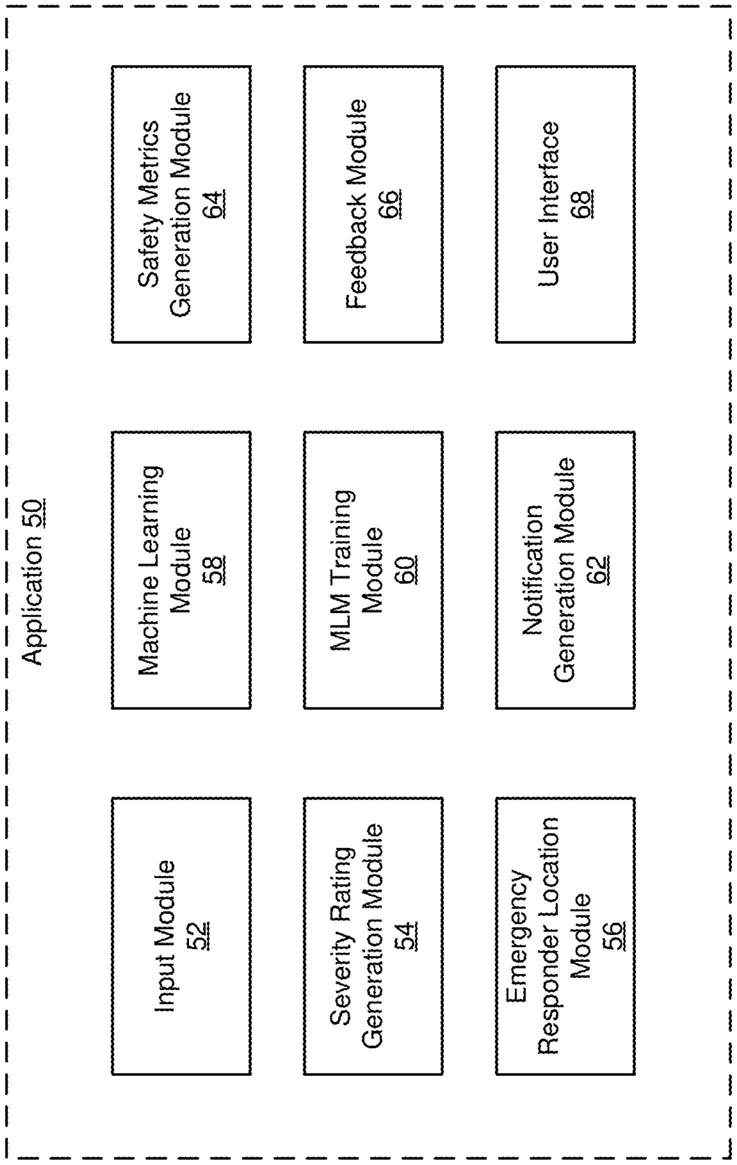
FIG. 2 is a functional block diagram of an example application of the system of FIG. 1 in accordance with the principles of the present disclosure.

With reference to FIG. 2, in various implementations, the application 50 may include an input module 52, a severity rating generation module 54, an emergency responder location module 56, a machine learning module 58, a machine learning model (MLM) training module 60, a notification generation module 62, a safety metrics generation module 64, a feedback module 66, and/or a user interface 68, among others.

In various implementations, in response to the vehicle 12 being in an accident, the input module 52 may receive information from the vehicle 12 (e.g., the sensor system 16, the GPS 20, etc.). In various implementations, the severity rating generation module 54 may determine an impact of the accident to the vehicle 12 and the occupants of the vehicle 12. For example, the severity rating generation module 54 may generate a set of ratings associated with the impact of the accident to the vehicle 12 and the occupants of the vehicle 12. In various implementations, a rating may be on a scale of 1 to 10, with 1 being associated with a low impact rating and 10 being associated with a high impact rating.

In some examples, a first subset of the set of ratings may include a vehicle impact rating, a vehicle damage rating, a vehicle deformity rating, a vehicle position relative to a road rating, and a vehicle orientation rating, among others. A second subset of the set of ratings may include an occupant injury rating and an occupant consciousness rating, among others.

In various implementations, the severity rating generation module 54 may generate a severity metric associated with the accident. The severity metric represents the severity of the accident. In various implementations, the severity rating generation module 54 may aggregate the set of ratings to generate the severity metric. In some examples, the severity rating generation module 54 may apply a weighted average to the set of ratings to generate the severity metric. For example, certain ratings (e.g., the vehicle damage rating, the vehicle deformity rating, the occupant injury rating, and the occupant consciousness rating, etc.) may be assigned larger weights in comparison with other ratings.

In various implementations, the emergency responder location module 56 may use at least some of the information from the input module 52 (e.g., information from the GPS 20 of the vehicle 12) to determine a current location of the vehicle 12. The emergency responder location module 56 may determine the closest emergency responders (e.g., the devices 30) based on the current location of the vehicle 12.

In various implementations, the machine learning module 58 may include and/or may execute at least one machine learned model. In various implementations, the machine learned model may receive information from the input module 52 and may use the information as an input. In response to the vehicle 12 being in an accident, the machine learned model may generate an output that is associated with an impact of the accident to the vehicle 12 and the occupants of the vehicle 12. For example, the machine learned model may generate a severity metric associated with the accident. The severity metric represents the severity of the accident. The machine learning module 58 may transmit the output generated from the machine learned model for display via the user interface 68.

In various implementations, the MLM training module 60 may train the machine learned model on a plurality of datasets associated with past vehicle accidents. In some examples, the datasets may be stored in the database 38. In various implementations, the MLM training module 60 may receive feedback data from the feedback module 66 and may use the feedback data to retrain the machine learned model. For example, the feedback data may be generated and/or transmitted from emergency responders (e.g., the devices 30) and/or occupants of the vehicle 12 (e.g., the user device 40). The feedback data may be associated with an accuracy of the severity metric generated via the machine learned model. In various implementations, the MLM training module 60 may retrain the machine learning model at least on a periodic basis. In some instances, the MLM training module 60 may retrain the machine learning model continuously.

In various implementations, retraining the machine learning model improves the efficiency and accurate of the generation of the severity metrics via the machine learned model. For example, the severity metrics may be generated quicker requiring less computer processing and less data storage. The foregoing improves the performance of the computing device (e.g., the controller 14, the server 36, a device 30, the user device 40) that is executing the application 50. For instance, the foregoing enables the computing device to use less computing power, less computing resources, and less data storage, among others.

In various implementations, the notification generations module 62 may generate notifications for display via the user interfaces 68 of the computing devices executing the application 50. For example, a notification may be displayed on the display 26 of the vehicle 12, displays of the devices 30, and the display of the user device 40, among others. In various implementations, a notification may include at least the severity rating of the accident and the location of the vehicle 12.

In various implementations, the safety metrics generation module 64 may generate safety metrics that may be displayed via one or more user interfaces 68. For example, the safety metrics may be displayed on the display 26 of the vehicle 12 and a display of the user device 40. The safety metrics may be used by the occupants of the vehicle 12 to avoid accidents. The safety metrics generation module 64 may use information from the input module 52 to generate the safety metrics. In various implementations, the safety metrics may be associated with current vehicle conditions, road conditions, and environmental conditions that are determine based on information from the sensor system 16 and the GPS 20 of the vehicle 12. The safety metrics notify the occupants of the vehicle 12 of adverse conditions that may impact the safety of the occupants such that the vehicle 12 may be operated accordingly.

Figure 3:
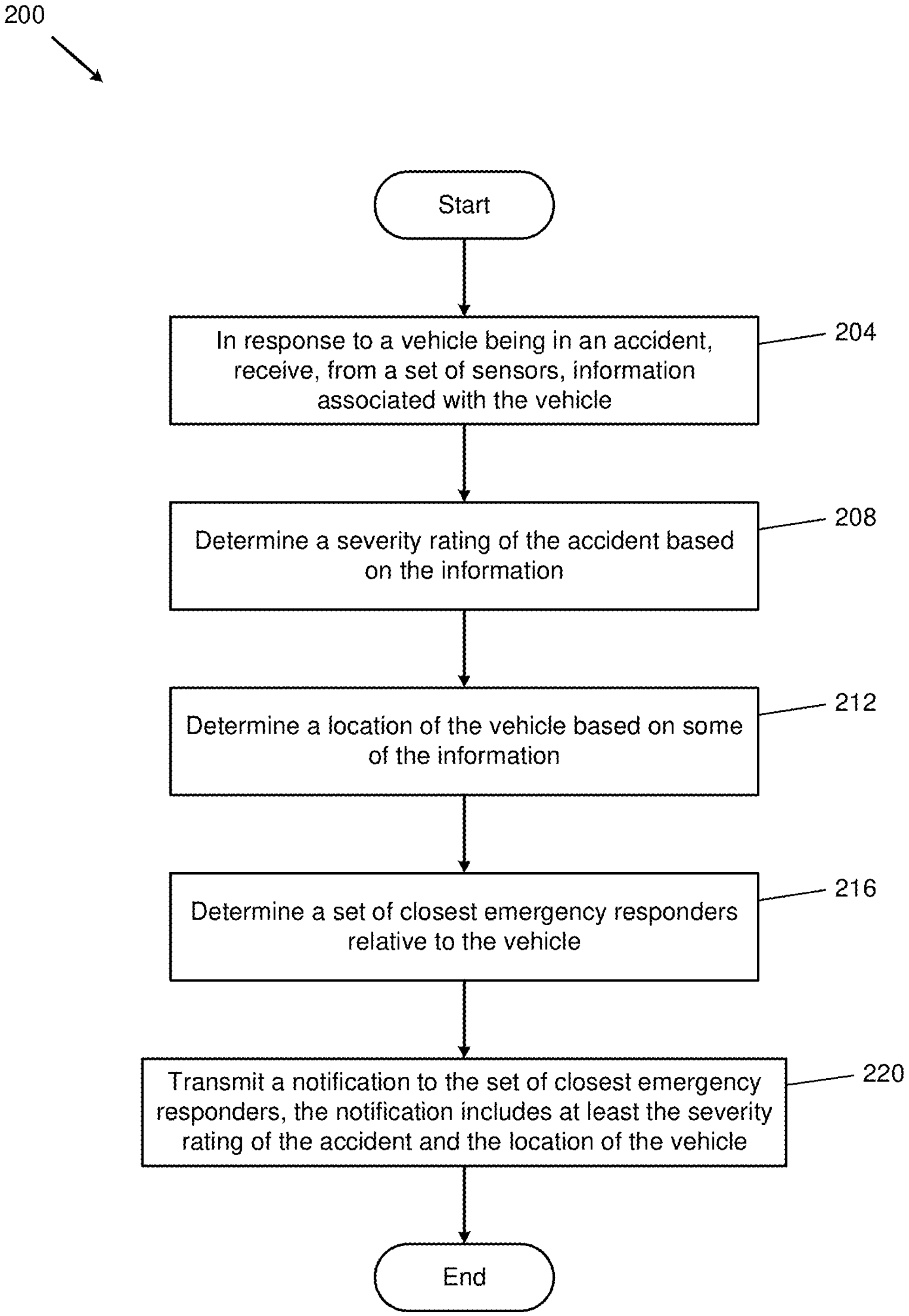
FIG. 3 is a flowchart of an example method for operating the system of FIG. 1 in accordance with the principles of the present disclosure.

FIG. 3 is an example method 200 for operating the system 10. The method 200 may begin at 204. At 204, in response to a vehicle 12 being in accident, the input module 52 may receive information, from the sensor system 16 (e.g., sensors 18) and the GPS 20, associated with the vehicle 12. The method 200 may proceed to 208.

At 208, the severity rating generation module 54 may determine and/or may generate a severity rating of the accident based on the information. In various implementations, determining the severity rating of the accident includes determining an impact of the accident to the vehicle 12 and determining an impact of the accident to at least one occupant of the vehicle 12. In various implementations, determining the severity rating of the accident includes generating a set of ratings associated with an impact of the accident to the vehicle 12 and at least one occupant of the vehicle 12 and aggregating the set of ratings to generate a severity metric.

Alternatively, the machine learned model may generate the severity rating of the accident based on the information. For example, the information may be inputted into the machine learned model and the machine learned model may generate a severity metric. The method 200 may procced to 212.

At 212, the emergency responder location module 56 may determine a location of the vehicle 12 based on some of the information (e.g., information from the GPS 20). The method 200 may proceed to 216.

At 216, the emergency responder location module 56 may determine and/or may identify a set of closest emergency responders relative to the vehicle 12. For example, the emergency responder location module 56 may determine the shortest distances from the location of the vehicle 12 to the computing devices 30 associated with the emergency responders (e.g., one or more hospitals 32-1, one or more police departments 32-2, and/or one or more fire departments 32-3). The method 200 may proceed to 220.

At 220, the notification generation module 62 may generate and transmit a notification to the devices 30 of the set of closest emergency responders. In various implementations, the notification includes at least the severity rating of the accident and the location of the vehicle 12. In various implementations, the notification may be display via the user interfaces 68 of the devices 30. In response to receiving the notification, the set of closest emergency responders may be dispatched to the location of the vehicle, for example, to provide medical care to the occupants of the vehicle 12. Then the method 200 may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The following Clauses provide an exemplary configuration for a crash severity detection system and related methods, as described above.

Clause 1: A system comprising: memory hardware configured to store instructions; and processor hardware configured to execute the instructions, wherein the instructions include: in response to a vehicle being in an accident, receiving, from a set of sensors, information associated with the vehicle; determining a severity rating of the accident based on at least some of the information; determining a location of the vehicle based on at least some of information; determining a set of emergency responders located closest to the vehicle; and transmitting a notification to the set of emergency responders, wherein the notification includes at least the severity rating of the accident and the location of the vehicle.

Clause 2: The system of clause 1, wherein determining the severity rating of the accident includes: determining an impact of the accident to the vehicle; and determining an impact of the accident to at least one occupant of the vehicle.

Clause 3: The system of clause 1 or 2, wherein determining the severity rating of the accident includes: generating a set of ratings associated with an impact of the accident to the vehicle and at least one occupant of the vehicle; and aggregating the set of ratings to generate a severity metric.

Clause 4: The system of clause 3, wherein a subset of the set of ratings includes at least one of: a vehicle impact rating, a vehicle damage rating, a vehicle deformity rating, a vehicle position relative to a road rating, or a vehicle orientation rating.

Clause 5: The system of clause 3, wherein a subset of the set of ratings includes at least one of: an occupant injury rating or an occupant consciousness rating.

Clause 6: The system of any of clauses 1 through 5, wherein determining the severity rating of the accident includes: inputting the information received from the set of sensors into a machine learned model; and generating, via the machine learned model, a severity metric.

Clause 7: The system of clause 6, wherein the machine learned model is trained on a plurality of datasets associated with past vehicle accidents.

Clause 8: The system of clause 6, wherein: the machine learned model is retrained with feedback data associated with an accuracy of the severity metric; the feedback data is generated from at least one of: the set of closest emergency responders or an occupant of the vehicle; and the machine learned model is retrained at least on a periodic basis.

Clause 9: The system of any of clauses 1 through 8, wherein the set of sensors are connected to the vehicle.

Clause 10: A vehicle comprising the system of any of clauses 1 through 9.

Clause 11: A computer-implemented method comprising: in response to a vehicle being in an accident, receiving, from a set of sensors, information associated with the vehicle; determining a severity rating of the accident based on at least some of the information; determining a location of the vehicle based on at least some of the information; determining a set of emergency responders located closest to the vehicle; and transmitting a notification to the set of emergency responders, wherein the notification includes at least the severity of the accident and the location of the vehicle.

Clause 12: The computer-implemented method of clause 11, wherein determining the severity rating of the accident includes: determining an impact of the accident to the vehicle; and determining an impact of the accident to at least one occupant of the vehicle.

Clause 13: The computer-implemented method of clause 11 or 12, wherein determining the severity rating of the accident includes: generating a set of ratings associated with an impact of the accident to the vehicle and at least one occupant of the vehicle; and aggregating the set of ratings to generate a severity metric.

Clause 14: The computer-implemented method of clause 13, wherein a subset of the set of ratings includes at least one of: a vehicle impact rating, a vehicle damage rating, a vehicle deformity rating, a vehicle position relative to a road rating, or a vehicle orientation rating.

Clause 15: The computer-implemented method of clause 13, wherein a subset of the set of ratings includes at least one of: an occupant injury rating or an occupant consciousness rating.

Clause 16: The computer-implemented method of any of clauses 11 through 15, wherein determining the severity rating of the accident includes: inputting the information received from the set of sensors into a machine learned model; and generating, via the machine learned model, a severity metric.

Clause 17: The computer-implemented method of clause 16, wherein the machine learned model is trained on a plurality of datasets associated with past vehicle accidents.

Clause 18: The computer-implemented method of clause 16, wherein: the machine learned model is retrained with feedback data associated with an accuracy of the severity metric; the feedback data is generated from at least one of: the set of closest emergency responders or an occupant of the vehicle; and the machine learned model is retrained at least on a periodic basis.

Clause 19: The computer-implemented method of any of clauses 11 through 18, wherein the set of sensors are connected to the vehicle.

Clause 20: A non-transitory computer-readable medium comprising processor-executable instructions that include: in response to a vehicle being in an accident, receiving, from a set of sensors, information associated with the vehicle; determining a severity rating of the accident based on the information; determining a location of the vehicle based on some of the information; determining a set of closest emergency responders relative to the vehicle; and transmitting a notification to the set of closest emergency responders, wherein the notification includes at least the severity of the accident and the location of the vehicle.

The invention claimed is:

1. A system comprising:

memory hardware configured to store instructions; and processor hardware configured to execute the instructions, wherein the instructions include:

in response to a vehicle being in an accident, receiving, from a set of sensors, information associated with the vehicle;

determining a severity rating of the accident based on at least some of the information, wherein determining the severity rating of the accident includes:

inputting the information received from the set of sensors into a machine learned model, and generating, via the machine learned model, a severity metric;

determining a location of the vehicle based on at least some of information;

determining a set of emergency responders located closest to the vehicle; and transmitting a notification to the set of emergency responders, wherein:

the notification includes at least the severity metric of the accident and the location of the vehicle, the machine learned model is retrained with feedback data associated with an accuracy of the severity metric;

the feedback data is generated from at least one of the set of emergency responders or an occupant of the vehicle; and the machine learned model is retrained at least on a periodic basis.

2. The system of claim 1 wherein determining the severity rating of the accident includes:

determining an impact of the accident to the vehicle; and determining an impact of the accident to at least one occupant of the vehicle.

3. The system of claim 1 wherein determining the severity rating of the accident includes:

generating a set of ratings associated with an impact of the accident to the vehicle and at least one occupant of the vehicle; and aggregating the set of ratings to generate a severity metric.

4. The system of claim 3 wherein a subset of the set of ratings includes at least one of: a vehicle impact rating, a vehicle damage rating, a vehicle deformity rating, a vehicle position relative to a road rating, or a vehicle orientation rating.

5. The system of claim 3 wherein a subset of the set of ratings includes at least one of: an occupant injury rating or an occupant consciousness rating.

6. The system of claim 1 wherein the machine learned model is trained on a plurality of datasets associated with past vehicle accidents.

7. The system of claim 1 wherein the set of sensors are connected to the vehicle.

8. A vehicle comprising:

the system of claim 1.

9. The system of claim 1 wherein:

the instructions further include generating a set of safety metrics for display on a display of the vehicle, the set of safety metrics is used for accident avoidance, and the set of safety metrics is based on at least one of a current vehicle condition, a current road condition, or a current environmental condition.

10. A computer-implemented method comprising:

in response to a vehicle being in an accident, receiving, from a set of sensors, information associated with the vehicle;

determining a severity rating of the accident based on at least some of the information, wherein determining the severity rating of the accident includes:

inputting the information received from the set of sensors into a machine learned model, and generating, via the machine learned model, a severity metric;

determining a location of the vehicle based on at least some of the information;

determining a set of emergency responders located closest to the vehicle; and transmitting a notification to the set of emergency responders, wherein:

the notification includes at least the severity metric of the accident and the location of the vehicle, the machine learned model is retrained with feedback data associated with an accuracy of the severity metric, the feedback data is generated from at least one of the set of emergency responders or an occupant of the vehicle, and the machine learned model is retrained at least on a periodic basis.

11. The computer-implemented method of claim 10 wherein determining the severity rating of the accident includes:

determining an impact of the accident to the vehicle; and determining an impact of the accident to at least one occupant of the vehicle.

12. The computer-implemented method of claim 10 wherein determining the severity rating of the accident includes:

generating a set of ratings associated with an impact of the accident to the vehicle and at least one occupant of the vehicle; and aggregating the set of ratings to generate a severity metric.

13. The computer-implemented method of claim 12 wherein a subset of the set of ratings includes at least one of: a vehicle impact rating, a vehicle damage rating, a vehicle deformity rating, a vehicle position relative to a road rating, or a vehicle orientation rating.

14. The computer-implemented method of claim 12 wherein a subset of the set of ratings includes at least one of: an occupant injury rating or an occupant consciousness rating.

15. The computer-implemented method of claim 10 wherein the machine learned model is trained on a plurality of datasets associated with past vehicle accidents.

16. The computer-implemented method of claim 10 wherein the set of sensors are connected to the vehicle.

17. A non-transitory computer-readable medium comprising processor-executable instructions that include:

in response to a vehicle being in an accident, receiving, from a set of sensors, information associated with the vehicle;

determining a severity rating of the accident based on the information, wherein determining the severity rating of the accident includes:

inputting the information received from the set of sensors into a machine learned model, and generating, via the machine learned model, a severity metric;

determining a location of the vehicle based on some of the information;

determining a set of closest emergency responders relative to the vehicle; and transmitting a notification to the set of closest emergency responders, wherein:

the notification includes at least the severity metric of the accident and the location of the vehicle, the machine learned model is retrained with feedback data associated with an accuracy of the severity metric, the feedback data is generated from at least one of the set of closest emergency responders or an occupant of the vehicle, and the machine learned model is retrained at least on a periodic basis.

* * * * *